July 2, 1968  B. KLIMEK  3,390,921

MODULATING SPRING BRAKE APPLICATION AND RELEASE VALVE

Filed Aug. 17, 1966

INVENTOR.
Boleslaw Klimek,
BY Parker & Carter
Attorneys.

3,390,921
MODULATING SPRING BRAKE APPLICATION
AND RELEASE VALVE
Boleslaw Klimek, Des Plaines, Ill., assignor to Berg Mfg.
& Sales Co., Des Plaines, Ill., a corporation of Illinois
Filed Aug. 17, 1966, Ser. No. 573,061
7 Claims. (Cl. 303—56)

ABSTRACT OF THE DISCLOSURE

A brake application and release valve, hand-operable by means of a double-surface cam, the major surface of which is an arc of a circle, the minor surface of which is of varying radii, the major cam portion having an arcuate slot through which a fixed pin extends, the valve being automatically returnable if the operator releases the cam during operation.

---

This invention relates to fluid pressure brake systems and has particular relation to a modulating application-release valve for the emergency spring-applied, pressure-released brakes of a vehicle.

Emergency brake actuators are known which include an air chamber on one side of a movable wall and an actuating spring on the other side of the movable wall. With pressure in the chamber the spring is compressed and the actuator has no effect on the vehicle brakes. Upon loss of pressure in the chamber the spring moves said wall to apply the vehicle brakes. Thus said actuators have had two positions, i.e., "brakes off" or "brakes on." It is accordingly one purpose of the present invention to provide the vehicle operator with means for modulating and varying the position of said wall and thus the application, in minutely variable amounts, of the vehicle brakes as conditions may require and to modulate the action of said emergency brake actuators at any desired position between and including full "brakes on" and full "brakes off" position.

Another purpose of the invention is to provide a hand-operated, modulating brake-application and release valve.

Another purpose is to provide a brake application and release valve including manually operable cam means for operating and controlling said valve.

Another purpose is to provide a manually operated modulating brake application valve having means returning said valve to full brakes-on position upon release of said valve from a position intermediate full brakes-off and full brakes-on position.

Another purpose is to provide a modulating brake application valve of maximum simplicity in operation and structure and maximum economy in manufacture and of minimum size and weight.

Other purposes will appear from time to time during the course of the specification and claims.

The invention is illustrated more or less diagrammatically in the accompanying drawings, wherein.

Like parts are indicated by like numerals throughout the specification and drawings.

Figure 1:
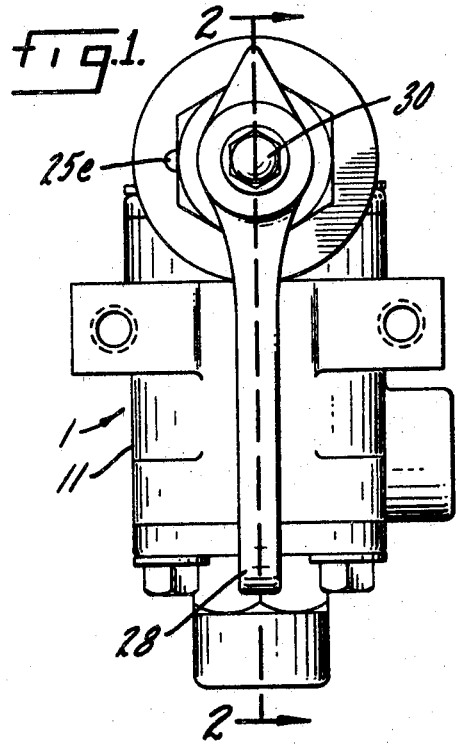
FIGURE 1 is a front elevation.

Referring now to the drawings, the numeral 1 generally designates a housing. Within the housing 1 an inlet chamber 2 is formed. A fluid pressure inlet port 3 communicates with the chamber 2 through passage 4. A fluid pressure outlet port 5 communicates with chamber 2, as indicated at 6, and with the air chamber of an emergency spring brake actuator (not shown) to deliver air under pressure to said chamber and thus to compress the spring in such brake actuator and hold or move such spring in or toward released or "brakes off" position. Passage 4 is controlled by service valve member 7 urged into closing position by yielding means 8. A valve stem 9 is secured to service valve 7 and extends through passage 4. Carried on valve stem 9 within chamber 2 is an exhaust valve 10. The parts 7, 9 and 10 together form a dual-valve member having inlet valve portion 7 and exhaust valve portion 10 joined for simultaneous movement.

Reciprocal within chamber 2 is an operating piston member 11 carrying the seal 12 in engagement with a portion of the wall of chamber 2. Yielding means 13 are positioned in chamber 2 to urge piston 11 in a direction away from exhaust valve 10.

Piston 11 is generally cup-shaped, forming the well 14. An exhaust passage 15 is formed in the bottom wall of piston 11 in a central position to be closed by exhaust valve 10, the passage 15 communicating well 14 with the portion of chamber 2 below (as the parts are shown) piston 11. An exhaust passage or port 16 is formed in the circumferential wall of piston 11 to communicate the well 14 with the portion of chamber 2 above seal 12 and thus with housing exhaust outlet port 17.

A yielding means, such as the spring 20, of substantially greater strength than the spring 13, is positioned in well 14. One end of spring 20 seats against the bottom wall of piston 11. The opposite end of spring 20 engages a spring retainer or compressor plate 21 having a relatively flat, upper abutment surface or portion 22. A retainer ring 23 engages the inner wall of piston 11 adjacent its upper open end and also engages an upper peripheral surface of member 21 to retain member 21 against the action of spring 20 and to maintain spring 20 in a predetermined preloaded condition when the shortest-radius portion of the below-described cam engages plate 21 or as the parts appear in FIGURE 2.

Rotatably mounted in housing 1 above member 20 is a cam member 25. As may be best seen in FIGURES 3 and 4, the cam 25 has a reduced-radius of flattened-arc portion 25a. The remainder portion 25b of cam 25 defines a continuous arc about a center 25c. As shown, the periphery of portion 25b comprises approximately 240 degrees of a circle having the center 25c. The shaft 26 eccentrically engages cam 25 with the axis of shaft 26 being spaced from the center 25c in the direction and within portion 25a as indicated at 26a. An arcuate slot 25d lies in portion 25b and extends arcuately through a major segment thereof. The closed ends of slot 25d approach more closely to the adjacent periphery of portion 25b than does the central arcuate portion of slot 25d. The pin 25e is supported in housing 1 and extends through slot 25d for engagement with the ends of slot 25d when cam 25 reaches the end of its travel in either direction, said ends serving as stop abutments for cam 25. Rotatably mounted also on housing 1 is a cam-operating shaft 26, the axis of rotation of which is substantially perpendicular to the direction of movement of piston 11 and valves 7 and 10. The shaft 26 is keyed eccentrically to cam 25 as indicated generally at 27. Shaft 26 extends externally of housing 1, the external portion of shaft 26 being keyed to manually operable handle member 28 as indicated at 29. A fastener means, such as that indicated at 30, retains handle 28 on shaft 26.

Whereas there has been shown and described an operative form of the invention, it should be understood that this showing and description are to be taken in an illustrative or diagrammatic sense only. There are many modifications in and to the invention which will be apparent to those skilled in the art and which will fall within the scope and spirit of the invention.

Figure 3:
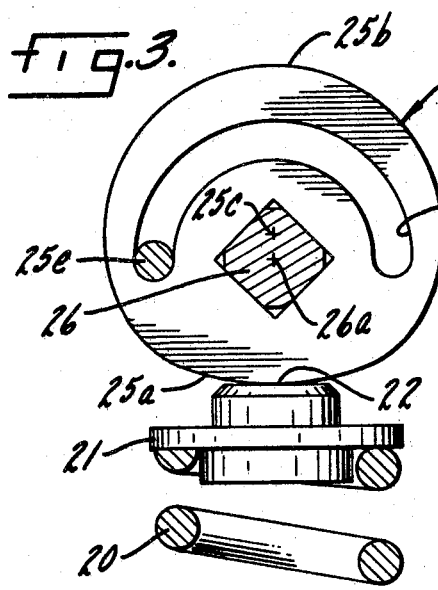
FIGURE 3 is a detail sectional view taken on line 3—3 of FIGURE 2.
Figure 4:
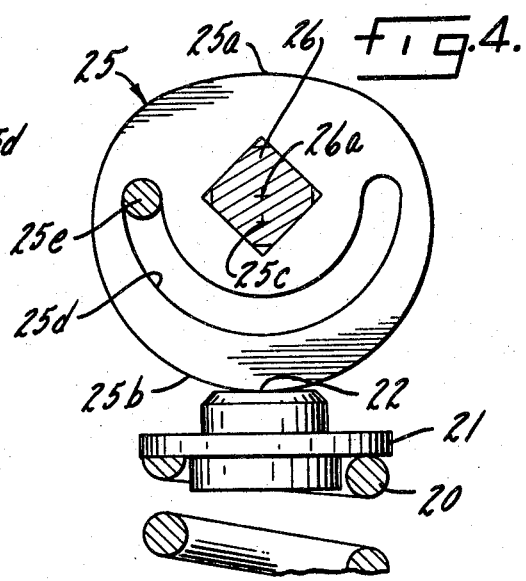
FIGURE 4 is a detail sectional view, like figures showing parts in another position.

The use and operation of the invention are as follows:

When the operator desires to release the vehicle emergency spring brakes, it is only necessary for the operator to rotate handle 28, producing a rotation of cam 25. Rotation of cam 25 against the surface 22 of member 21 produces a downward motion of member 21 tending to compress spring 20. Continued rotation of eccentric cam 25 produces a downward movement of piston 11 and valve 10 which is thus closing exhaust passage 15. Continued movement of piston 11, in a downward direction as the parts are shown in the drawings, produces through stem 9 an unseating of service valve 7 to open passage 4. Thereupon fluid pressure from the source (not shown) in communication with inlet 3 passes through passage 4, chamber 2 and outlet 5 to the air chamber of the emergency brake actuator to compress its spring and to release the vehicle brakes. As the parts are shown in FIGURE 3, the flattened-arc portion or shortest-radius portion 25a of cam 25 engages the surface 22 of member 21. It will be realized that rotation of cam 25, to produce release of the brakes as above described, moves the portion 25a out of engagement with the member 21 and rotates the cam 25 into the position shown, for example, in FIGURE 4, in which position the cam 25 will remain (until handle 28 be again moved) to maintain the emergency brake in brakes-off or released position.

Figure 2:
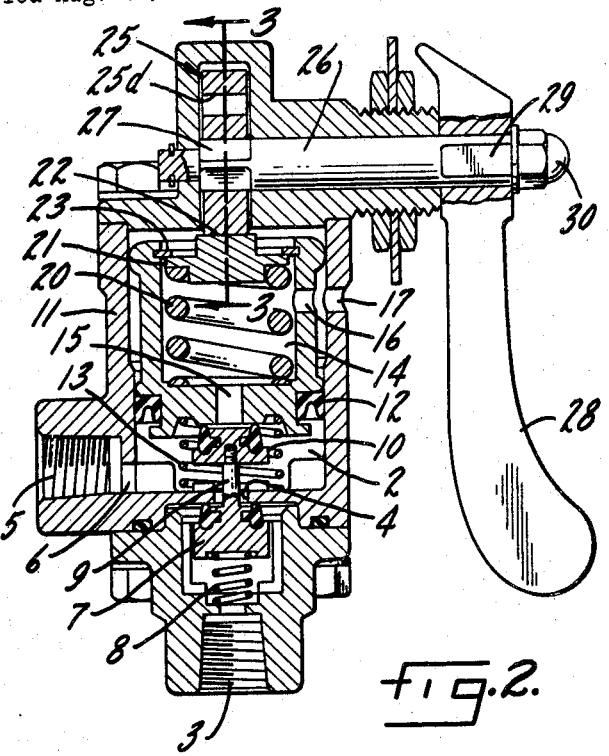
FIGURE 2 is a cross-sectional view taken on a line 2—2 of FIGURE 1.

Upon return of handle 28 to the position of FIGURE 1 by the operator, the action of springs 13 and 20 and the pressure in the system and present at port 5 and in chamber 2 below piston 11 are effective to urge member 21 upwardly, as the parts are shown in the drawings, against cam 25 and to rotate the same back into the exhaust position shown in FIGURES 1 and 2, the piston 11 and valve members 7 and 10 returning to the position of FIGURE 1, and the pressure below piston 11 in chamber 2 will unseat piston 11 from valve 10 to exhaust the system through port 5, chamber 2, passage 15, well 14 and passages 16 and 17 and thus to free the spring in the emergency brake actuator and to apply the brakes of the vehicle.

The assembly of the invention comprises a manually operable application valve of improved sensitivity whereby the operator's rotation of handle 28 throughout its excursion may produce, through the movement of cam 25 into various positions between the opposite ends of its travel, and the resulting "feel" provided by spring 20, minute variations in application and release of the emergency brake actuator as may be required by a wide variance in circumstances, such as vehicle speed, vehicle weight, road conditions and the like. Should the operator accidentally or for any reason inadvertently release the member 28 when cam 25 is at an intermediate position, the assembly of the invention will function automatically to move into the position of FIGURE 1 and thus to exhaust the emergency brake air chamber, thereby applying the vehicle brakes.

What is claimed is:

1. A valve assembly including a housing, a chamber in said housing, an inlet port communicating with said chamber, an outlet port communicating with said chamber, a dual valve member having an inlet valve portion posiitoned to close communication between said inlet port and said chamber, a spring urging said dual valve member into said inlet-port-closing position, a cup-shaped piston reciprocal in said chamber, an exhaust passage through said piston, an exhaust port in said housing communicating at all times with said piston exhaust passage, said dual valve member having an exhaust valve portion positioned to close said piston exhaust passage, and means for moving said dual valve member to close said piston exhaust passage and open communication of said inlet port with said outlet port through said chamber, said means including a yielding member within and having one of its ends engaging the bottom wall of said piston, an abutment plate engaging the opposite end of said yielding member, an eccentric cam mounted for rotation in said housing in constant contact with said abutment plate, said cam having a constant-radius major portion and a variable-radius minor portion, a shaft rotatable in said housing and engaging said cam, said shaft having portion extending outwardly of said housing, and a handle member secured to said shaft portion.

2. The structure of claim 1 characterized by and including a retainer ring secured to and extending annularly into the upper open end of said piston, said ring engaging the upper peripheral surface of said abutment plate and retaining said yielding member under a predetermined preload when said cam has its shortest radius portion in contact with said plate.

3. The structure of claim 1 characterized by and including an arcuate slot in said cam major portion and a pin secured to said housing and extending laterally through said slot, the ends of said slot serving as stop means limiting the movement of said cam.

4. The structure of claim 1 wherein said cam major portion has a circumferential wall surface extending through an arc of approximately 240 degrees, said minor portion has a curved outer wall surface joining the opposite ends of said circumferential wall surface, and said minor portion has a central radius less than the radius of said major portion.

5. The structure of claim 4 wherein said cam minor portion engages said abutment plate in alignment with said central radius when said dual valve member is in said inlet-port-closing position.

6. The structure of claim 1 wherein said cam has over-center portions engageable with said abutment plate when said cam is at either end of its travel, whereby said handle, cam, piston and dual valve member will remain in the position placed when said cam is at either end of its travel.

7. The structure of claim 6 wherein said cam has a curved surface extending between said over-center portions and engageable with said abutment plate when said cam is at a point intermedaite the opposite ends of its travel, whereby said handle, cam, piston and dual valve member will return to the position in which said dual valve member closes said inlet port upon release of said handle when said cam is in said intermediate point.

References Cited
UNITED STATES PATENTS

| | | | |
|---|---|---|---|
| 1,814,565 | 7/1931 | Lombard | 303—54 |
| 1,927,700 | 9/1933 | Dickinson | 303—52 |
| 2,322,518 | 6/1943 | Huber | 303—52 |
| 2,991,662 | 7/1961 | Werner | 74—526 X |
| 3,139,769 | 7/1964 | Gauchat | 74—526 X |
| 3,284,142 | 11/1966 | Bueler | 303—54 X |

MILTON BUCHLER, *Primary Examiner.*

FERGUS S. MIDDLETON, *Examiner.*

J. McLAUGHLIN, *Assistant Examiner.*